(12) United States Patent
Huang (10) Patent No.: US 9,977,550 B2
(45) Date of Patent: May 22, 2018

(54) ACTIVE ONE-LAYER MULTI-TOUCH SENSOR PANEL DEVICE

(71) Applicant: FocalTech Systems Co., Ltd., Hsinchu (TW)

(72) Inventor: Yen-Lin Huang, Hsinchu (TW)

(73) Assignee: FOCALTECH SYSTEMS CO., LTD., Hsinchu (TW)

(*) Notice: Subject to any disclaimer, the term of this patent is extended or adjusted under 35 U.S.C. 154(b) by 165 days.

(21) Appl. No.: 14/698,003

(22) Filed: Apr. 28, 2015

(65) Prior Publication Data

US 2015/0309622 A1 Oct. 29, 2015

(30) Foreign Application Priority Data

Apr. 29, 2014 (TW) .............................. 103115373 A (51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
CPC .................................. G06F 3/0412; G06F 3/044
USPC ........................................................ 345/174
See application file for complete search history.

(56) References Cited

U.S. PATENT DOCUMENTS

| | | | | |
|---|---|---|---|---|
| 2012/0319966 | A1* | 12/2012 | Reynolds ................ | G06F 3/041 345/173 |
| 2013/0278535 | A1* | 10/2013 | Kim ........................ | G06F 3/0416 345/173 |
| 2014/0152615 | A1* | 6/2014 | Chang ..................... | G06F 3/044 345/174 |
| 2014/0176484 | A1* | 6/2014 | Tsai ......................... | G06F 3/044 345/174 |
| 2014/0362041 | A1* | 12/2014 | Chen ....................... | G06F 3/044 345/174 |
| 2015/0179133 | A1* | 6/2015 | Lee ......................... | G06F 3/044 345/174 |
| 2015/0185936 | A1* | 7/2015 | Kim ........................ | G06F 3/0412 345/174 |

* cited by examiner

*Primary Examiner* — Yuzhen Shen
(74) *Attorney, Agent, or Firm* — Bacon & Thomas, PLLC (57) ABSTRACT

An active one-layer multi-touch sensor panel device includes a one-layer multi-touch sensor panel, a die of touch controller IC, and a flexible printed circuit board. The one-layer multi-touch sensor panel has a plurality of conductive lines for forming a plurality of touch sensing areas thereon. The die of touch controller IC is bonded onto the one-layer multi-touch sensor panel by a chip-on-glass method. The die of touch controller IC is connected to the plurality of conductive lines to drive the plurality of conductive lines and receive sensing signals associated with the plurality of conductive lines for detecting touch positions on the one-layer multi-touch sensor panel. The flexible printed circuit board is electrically connected to the die of touch controller IC by the one-layer multi-touch sensor panel to transmit the sensing signals received.

10 Claims, 9 Drawing Sheets

ACTIVE ONE-LAYER MULTI-TOUCH SENSOR PANEL DEVICE

BACKGROUND OF THE INVENTION

1. Field of the Invention

The present invention relates to the technical field of touch panels and, more particularly, to an active one-layer multi-touch sensor panel device.

2. Description of Related Art

Modern consumer electronics are mostly provided with a touchpad in a touch panel as one of the input devices. The principle of touch panels is based on different sensing manners to detect a voltage, current, acoustic wave, or infrared to detect the coordinate of a touch point on a screen where a finger or the like touches. For example, a capacitive touch panel uses a capacitance change generated in an electrostatic combination of the arranged transparent electrodes and a human body to generate a current or voltage for detecting the touching coordinates.

The need of multi-touch technology is increased as smart phones become more and more popular. Currently, the multi-touch technology essentially uses an Indium Tin Oxide (ITO) material to form a plurality of sensing units arranged in a matrix form with interlaced rows and columns, so as to detect accurate touch positions. The principle of the multi-touch technology is based on a capacitive sensing to use the design of a plurality ITO electrodes after etching to provide multiple sets of transparent conductive lines that are mutually vertical in different planes, so as to form driving lines of X-axis and Y-axis. These conductive lines are controlled by a controller to sequentially scan and detect the changes of capacitance for being fed to the controller.

However, the ITO material is very expensive, and thus a touch panel with a two-layer ITO material is gradually replaced by one with a one-layer ITO material.

Figure 1:
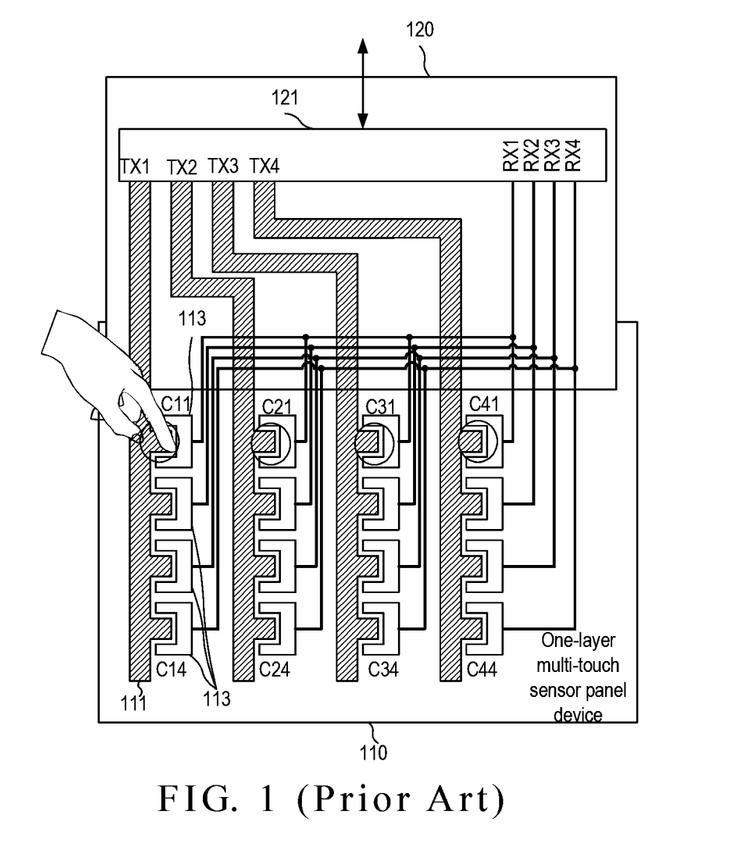
FIG. 1 is a schematic view of a typical one-layer multi-touch sensor device.

FIG. 1 is a schematic view of a typical one-layer multi-touch sensor panel device. In FIG. 1, a plurality of ITO conductive lines are etched and formed on the one-layer multi-touch sensor panel device 110. The ITO conductive lines are divided into driving conductive lines 111 and sensing conductive lines 113. The driving conductive lines 111 and the sensing conductive lines 113 are in an interlaced arrangement without crossing to one another, so as to form a sensing block. As shown in FIG. 1, one driving conductive line 111 is operated with four sensing conductive lines 113 which are individually routed on the one-layer multi-touch sensor panel device 110 and connected to a flexible printed circuit board (FPC) 120. At last, the four sensing conductive lines 113 are short-circuited to form a line RX1 on the FPC 120, and the line RX1 is connected to the touch controller IC 121. Such a short-circuit line is advantageous in having no crossing line on the one-layer multi-touch sensor panel device 110, so that the one-layer multi-touch sensor panel device 110 can be implemented by one layer of conductor. Although the FPC 120 requires a larger area, the overall cost of the one-layer multi-touch sensor panel device is lower than that of the two-layer multi-touch sensor panel device.

The one-layer multi-touch sensor panel device in FIG. 1 can provide a benefit of low cost, but it has a disadvantage in being very sensitive to noises when performing touch and sensing. When the touch controller IC 121 drives the driving conductive line 111 during a certain time interval and a position C11 is touched by a finger, the touch controller IC 121 can detect the touch on the position C11. However, in the configuration of FIG. 1, if a noise presents at a position C31, due to the sensing conductive lines 113 on the positions C31 and C11 being short-circuited to form a line RX1 on the FPC 120, the sensed electrical feature at the position C11 is thus influenced, resulting in erroneous determination of the touch controller IC 121 and decreased accuracy of touch detection.

Therefore, it is desirable to provide an improved on-layer multi-touch sensor panel device to mitigate and/or obviate the aforementioned problems.

SUMMARY OF THE INVENTION

The object of the present invention is to provide an active one-layer multi-touch sensor panel device, which can overcome the problem of SNR reduction due to the noise interferences between sensing blocks, so as to increase the accuracy of touch detection and effectively reduce the area required for a flexible PCB thereby saving the cost.

According to a feature of the present invention, there is provided an active one-layer multi-touch sensor panel device, which comprises: a one-layer multi-touch sensor panel having a plurality of conductive lines arranged in a predetermined manner without crossing, so as to form a plurality of touch sensing areas thereon; a die of touch controller IC bonded onto the one-layer multi-touch sensor panel and connected to the plurality of conductive lines for driving the plurality of conductive lines and receiving sensing signals associated with the plurality of conductive lines so as to detect touch positions on the one-layer multi-touch sensor panel, the die of touch controller IC having a plurality of switch sets connected to the plurality of conductive lines, such that only one of the switch sets is activated in a specific time interval to perform a touch sensing on a part of the conductive lines connected to the switch set activated; and a flexible printed circuit board electrically connected to the die by the one-layer multi-touch sensor panel for transmitting the sensing signals received, wherein the die of touch controller IC is bonded onto the one-layer multi-touch sensor panel by a chip-on-glass (COG) method.

According to another feature of the present invention, there is provided an active one-layer multi-touch sensor panel device, which comprises: a one-layer multi-touch sensor panel having a plurality of conductive lines arranged in a predetermined manner without crossing, so as to form a plurality of touch sensing areas thereon, wherein the plurality of conductive lines are divided into N driving conductive lines and N×M sensing conductive lines, each of the N driving conductive lines corresponding to M sensing conductive lines to form a sensing block, such that the panel is divided into N sensing blocks; and a flexible printed circuit board having a die of touch controller IC with N switch sets and N output terminals, the N output terminals being connected to the N driving conductive lines respectively, each of the N switch sets having M input terminals respectively connected to the M sensing conductive lines corresponding to one of the N sensing blocks.

According to still another feature of the present invention, there is provided an active one-layer multi-touch sensor panel device, which comprises: a one-layer multi-touch sensor panel having N switch sets and a plurality of conductive lines arranged in a predetermined manner without crossing, so as to form a plurality of touch sensing areas thereon, wherein the plurality of conductive lines are divided into N driving conductive lines and N×M sensing conductive lines, each of the N driving conductive lines corresponding to M sensing conductive lines to form a sensing block, such that the panel is divided into N sensing blocks, and each of the N switch sets has M input terminals respectively connected to the M sensing conductive lines corresponding to one of the N sensing blocks, where N and M are each a positive integer; and a flexible printed circuit board which has a touch controller IC connected to the N driving conductive lines and the N switch sets to drive the N driving conductive lines and receive sensing signals associated with the plurality of conductive lines, wherein each of the N switch sets has M output terminals, and i-th output terminals of respective switch sets are connected together for further connection to a corresponding receiving terminal of the touch controller IC, where i is an index.

According to yet another feature of the present invention, there is provided an active one-layer multi-touch sensor panel device, which comprises: a one-layer multi-touch sensor panel having N switch sets and a plurality of conductive lines arranged in a predetermined manner without crossing, so as to form a plurality of touch sensing areas thereon, wherein the plurality of conductive lines are divided into N driving conductive lines and N×M sensing conductive lines, and each of the N driving conductive lines is operated with M sensing conductive lines to form a sensing block, such that the panel is divided into N sensing blocks, and each of the N switch sets has M input terminals and M output terminals and is respectively connected to the M sensing conductive lines corresponding to one of the N sensing blocks, where N and M are each a positive integer; a flexible printed circuit board having 2N traces connected to the N driving conductive lines of the one-layer multi-touch sensor panel and the output terminals of the N switch sets respectively; and a printed circuit board having a touch controller IC electrically connected to the N driving conductive lines and the output terminals of the N switch sets via the 2N traces of the flexible PCB, so as to drive the N driving conductive lines and receive sensing signals associated with the plurality of conductive lines, wherein i-th output terminals of respective switch sets are connected for further connection to a corresponding receiving terminal of the touch controller IC, where i is an index.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
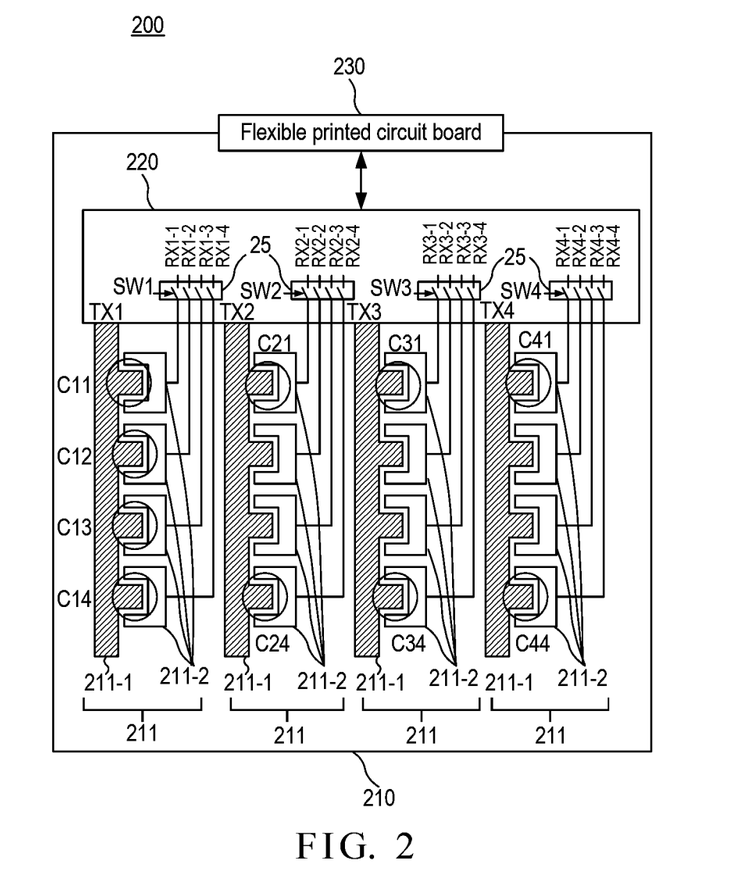
FIG. 2 is a schematic view of an active one-layer multi-touch sensor panel device according to an embodiment of the invention.

FIG. 2 is a schematic view of an active one-layer multi-touch sensor panel device 200 according to an embodiment of the invention. The device 200 includes an one-layer multi-touch sensor panel 210, a die 220 of touch controller IC, and a flexible printed circuit board 230.

The one-layer multi-touch sensor panel 210 has a plurality of conductive lines 211 arranged in a predetermined manner without crossing so as to form a plurality of touch sensing areas on the one-layer multi-touch sensor panel 210.

The conductive lines 211 are divided into N driving conductive lines 211-1 and N×M sensing conductive lines 211-2. Each driving conductive line 211-1 is operated with M sensing conductive lines 211-2 to form a sensing block, such that the panel 210 is divided into N sensing blocks, where N and M are each a positive integer. In this embodiment, we have N=4 and M=4 for convenient description.

The die 220 of touch controller IC is bonded onto the one-layer multi-touch sensor panel 210, and is electrically connected to the plurality of conductive lines 211 to drive them and receive sensing signals associated with the conductive lines 211 for detecting touch positions on the one-layer multi-touch sensor panel 210. The die 220 has N switch sets (SW) 25 connected to the N×M sensing conductive lines 211-2. Each switch set 25 has M input terminals and M output terminals. The M input terminals are connected to the M sensing conductive lines 211-2 corresponding to a sensing block, and the M output terminals are used as the receiving terminals RX in the die 220. Further, each switch set 25 has M switches connected to the M sensing conductive lines 211-2, respectively. Turing one switch set 25 on/off indicates that the M switches of the switch set 25 are concurrently turned on/off, so that a touch control can be achieved by turning the switch sets 25 on/off.

The die 220 of touch controller IC is bonded onto the panel 210 by an anisotropic conductive film (ACF), ultra-violet adhesive, or silver paste.

The flexible printed circuit board 23 is electrically connected to the die 220 by the one-layer multi-touch sensor panel 210 so as to transmit the received sensing signals. The die 220 of touch controller IC is bonded onto the one-layer multi-touch sensor panel 210 by a chip-on-glass (COG) method.

Figure 3:
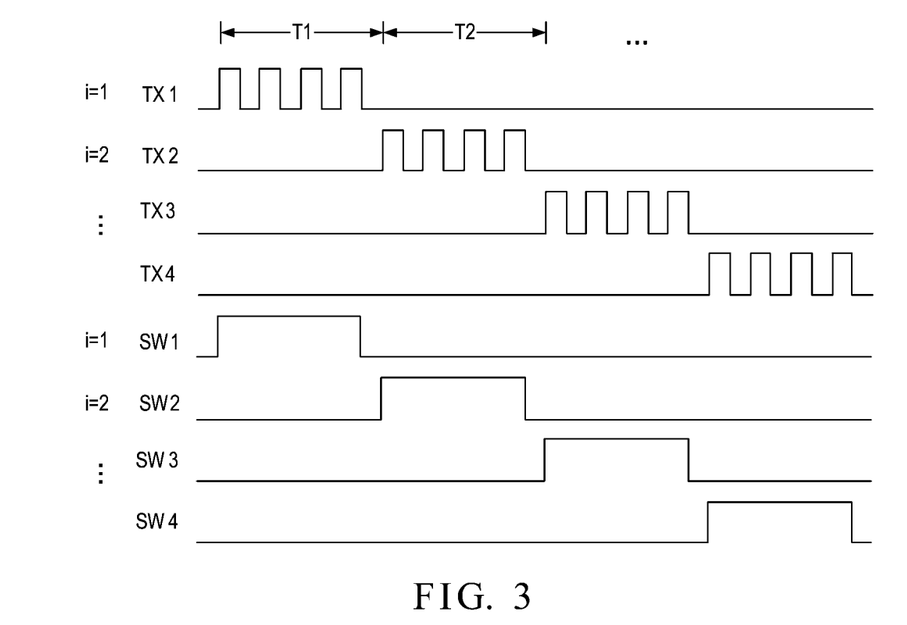
FIG. 3 is a graph illustrating touch driving and detection performed by a die of touch controller IC according to an embodiment of the invention.

FIG. 3 is a graph illustrating touch driving and detection performed by the die 220 of touch controller IC according to an embodiment of the invention. The die 220 drives an i-th driving conductive line in a specific time interval and activates an i-th switch set 25 to receive the sensing signals from the M sensing conductive lines corresponding to an i-th sensing block, where i is an index. As shown in FIG. 3, the die 220 drives a first driving conductive line 211-1 in the specific time interval T1 and activates a first switch set SW1 to receive the sensing signals from the M sensing conductive lines 211-2 corresponding to a first sensing block. Next, the die 220 drives a second driving conductive line 211-1 in the specific time interval T2 and activates a second switch set SW2 to receive the sensing signals from the M sensing conductive lines 211-2 corresponding to a second sensing block, and so on. Thus, touch driving and detection on the entire one-layer multi-touch sensor panel 210 can be completed. In the first specific time interval T1, as shown in FIG. 3, only the first switch set SW1 is activated to prevent the operation from being affected by noises of the conductive lines 211 connected to the other switch sets, so as to overcome the problem of noise interference in the prior art of FIG. 1.

Figure 4:
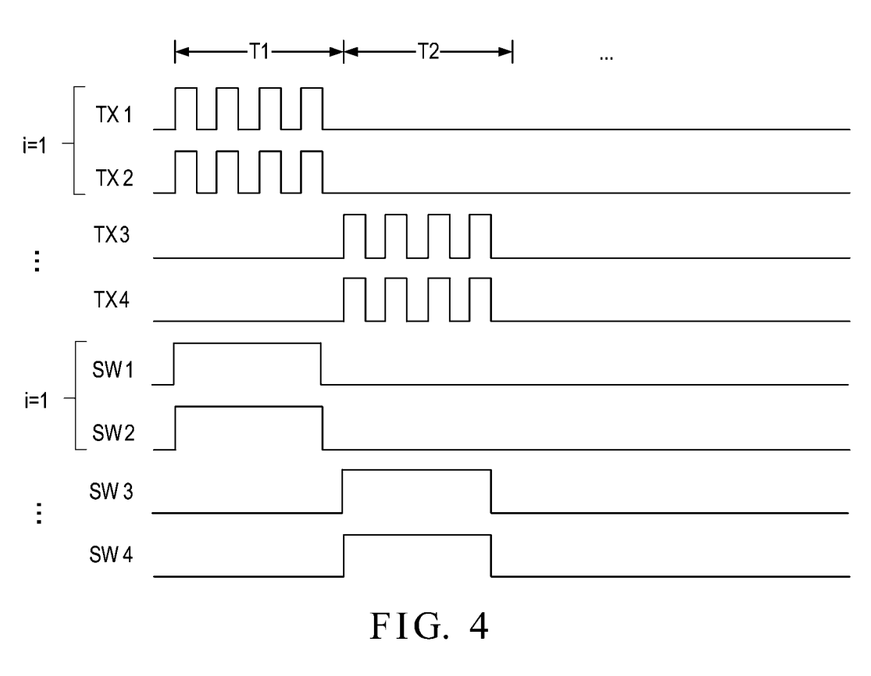
FIG. 4 is a graph illustrating another touch driving and detection performed by a die of touch controller IC according to an embodiment of the invention.

FIG. 4 is a graph illustrating another touch driving and detection performed by the die 220 of touch controller IC according to an embodiment of the invention. The die 220 drives the i-th and (i+1)-th driving conductive lines in a specific time interval and activates the i-th and (i+1)-th switch sets 25 to receive the sensing signals from the M sensing conductive lines corresponding to the i-th and (i+1)-th sensing blocks respectively, where i is an index. As shown in FIG. 4, the die 220 drives the first and second driving conductive lines 211-1 in the specific time interval T1 and activates the first and second switch sets SW1, SW2 to receive the sensing signals from the M sensing conductive lines 211-2 corresponding to the first and second sensing blocks respectively, and so on. Thus, touch driving and detection on the entire one-layer multi-touch sensor panel 210 can be completed.

Figure 5:
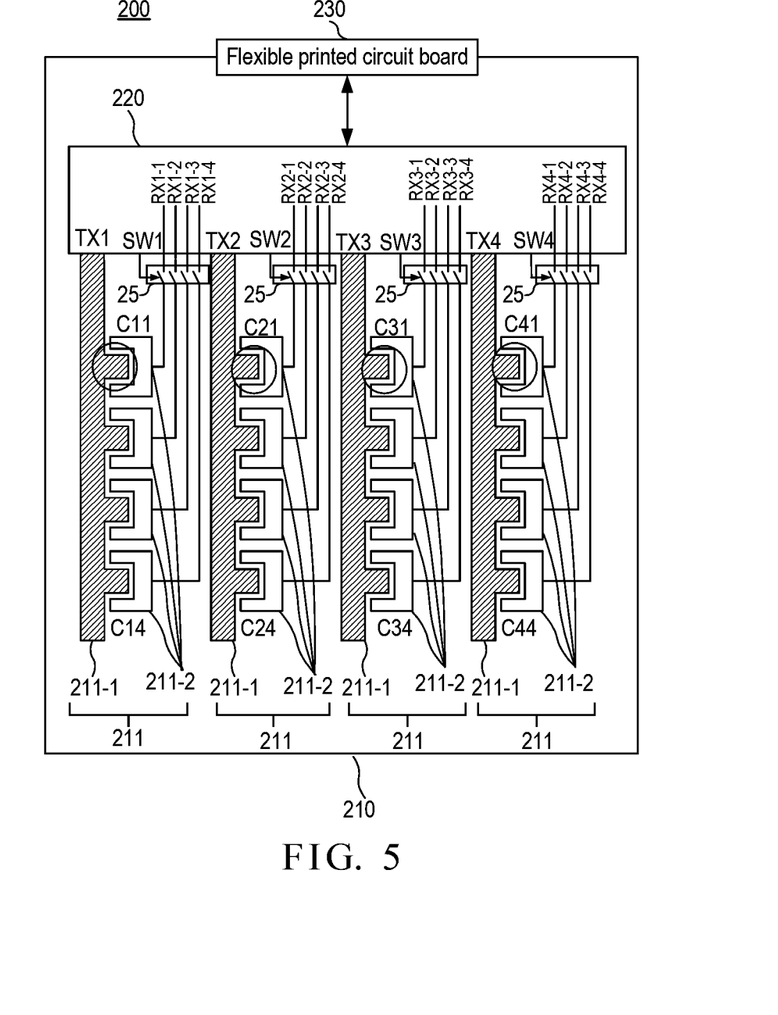
FIG. 5 is a schematic view of aa active one-layer multi-touch sensor panel device according to another embodiment of the invention.

FIG. 5 is a schematic view of an active one-layer multi-touch sensor panel device 200 according to another embodiment of the invention, which is similar to the embodiment of FIG. 2 except that the N switch sets 25 are moved from the die 220 to the panel 210; i.e., the panel 210 further includes N switch sets 25, each having M input terminals and M output terminals. The M input terminals are connected to M sensing conductive lines 211-2 corresponding a sensing block, and the M output terminals are connected to corresponding receiving terminals of the die 220 (RXA-1, RXA-2, RXA3, RXA4, where A=1, 2, 3, ..., N).

Figure 6:
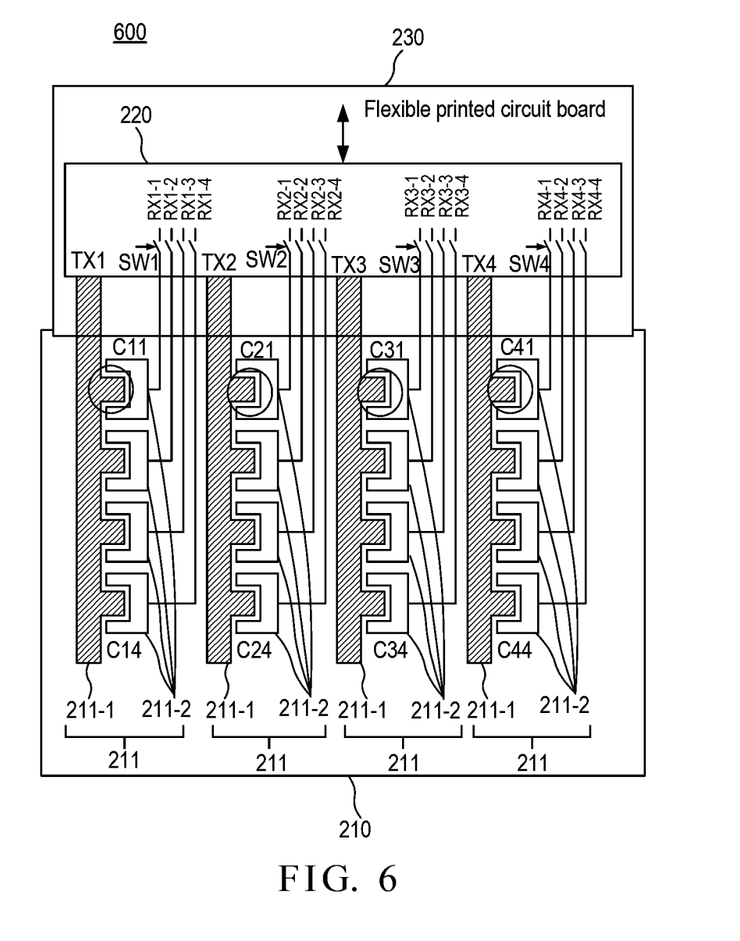
FIG. 6 is a schematic view of an active one-layer multi-touch sensor panel device according to still another embodiment of the invention.

FIG. 6 is a schematic view of an active one-layer multi-touch sensor panel device 600 according to still another embodiment of the invention. As compared with FIG. 2, the difference in FIG. 6 is that the die 220 is moved to the flexible PCB 230, and the remaining configuration is identical to that of FIG. 2, and thus a detailed description therefor is deemed unnecessary.

Figure 7:
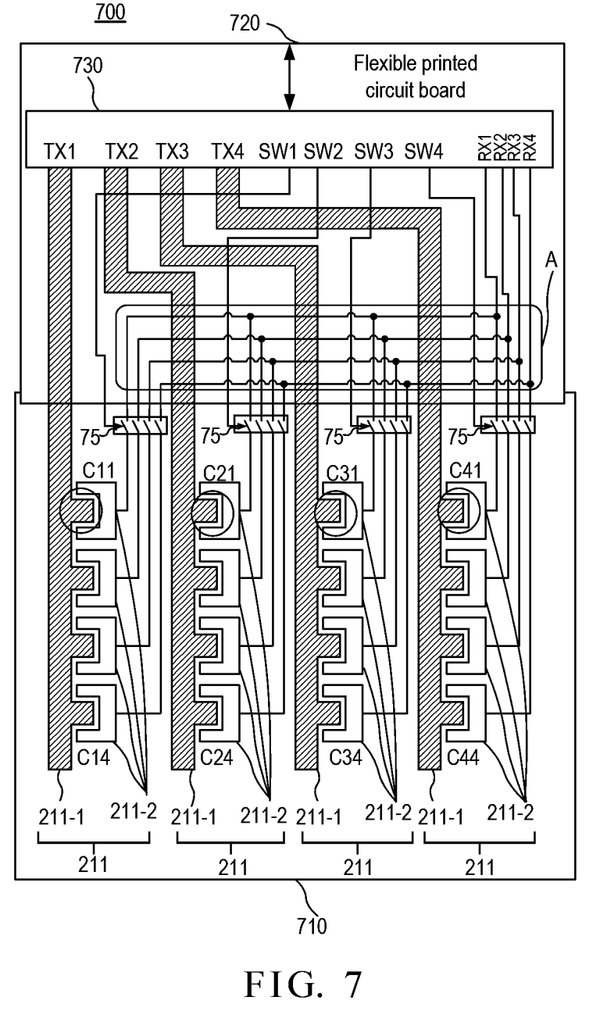
FIG. 7 is a schematic view of an active one-layer multi-touch sensor panel device according to yet another embodiment of the invention.

FIG. 7 is a schematic view of an active one-layer multi-touch sensor panel device 700 according to yet another embodiment of the invention. The device 700 includes a one-layer multi-touch sensor panel 710 with a plurality of conductive lines 211 and N switch sets 75, and a flexible PCB 720 with a touch controller IC 730. The conductive lines 211 are arranged in a predetermined manner without crossing, so as to form a plurality of touch sensing areas on the panel 710. The conductive lines 211 are divided into N driving conductive lines 211-1 and N×M sensing conductive lines 211-2. Each of the driving conductive lines 211-1 is operated with M sensing conductive lines 211-2 to form a sensing block. Therefore, the panel 710 is divided into N sensing blocks. The touch controller IC 730 is connected to the N driving conductive lines 211-1 and the N switch sets 75 in order to drive the N driving conductive lines 211-1 and receive the sensing signals from the conductive lines 211-2. Each of the switch sets 75 has M input terminals and M output terminals. The M input terminals are connected to M sensing conductive lines 211-2 corresponding to a sensing block. The M output terminals of each switch set 75 are respectively connected to a corresponding receiving terminal RX of the touch controller IC 730. More specifically, the panel 710 has N switch sets 75 connected to the N×M sensing conductive lines 211-2. The first output terminals of respective switch sets 75 are connected together for further connection to a corresponding receiving terminal RX1 of the touch controller IC 730. Likewise, the second output terminals of respective switch sets 75 are connected together for further connection to a corresponding receiving terminal RX2 of the touch controller IC 730, and so on.

The embodiment of FIG. 7 is similar to that of FIG. 2, except that the N switch sets are implemented in the panel 710, and the touch controller IC 730 is implemented on the flexible PCB. FIG. 7 is drawn for illustrative purpose but not in actual scale. As shown in FIG. 7, since the N×M sensing conductive lines 211-2 can be reduced to N lines at an area denoted by the rectangle A, the size of the flexible PCB 620 becomes relatively small and, due to the switch sets 75, the touch detection is not affected by noises.

Figure 8:
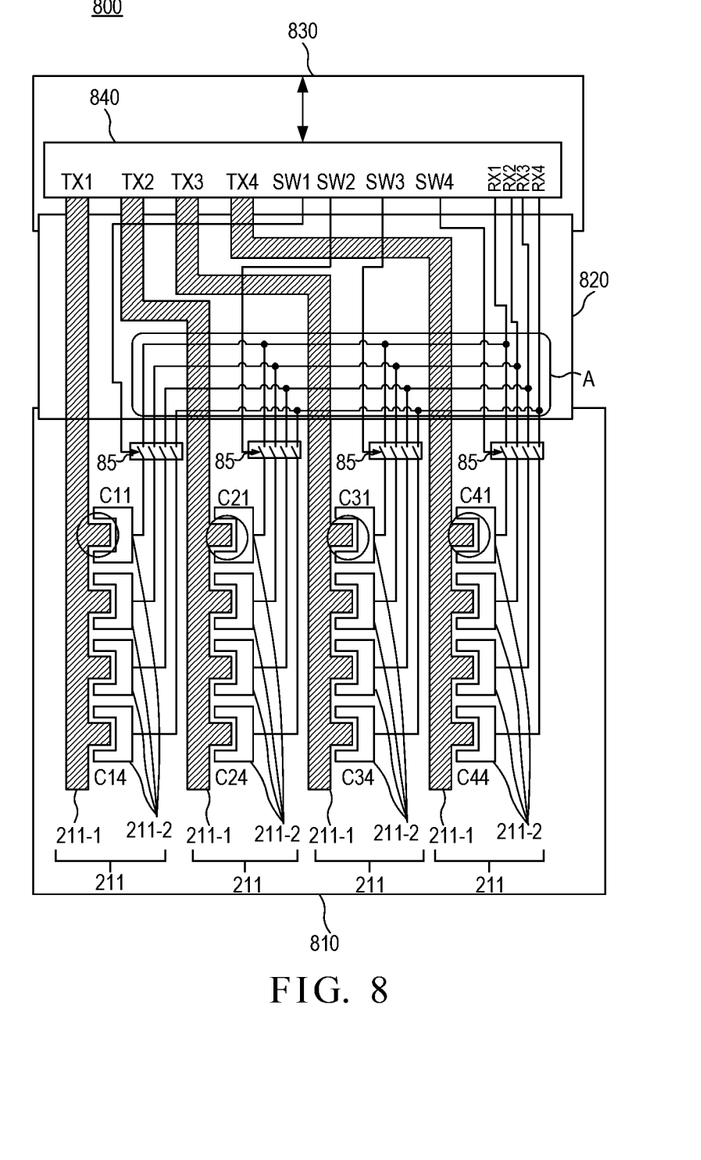
FIG. 8 is a schematic diagram of an active one-layer multi-touch sensor panel device according to further another embodiment of the invention.

FIG. 8 is a schematic diagram of an active one-layer multi-touch sensor panel device 800 according to further another embodiment of the invention. The device 800 includes a one-layer multi-touch sensor panel 810 with a plurality of conductive lines 211 and N switch sets 85, a flexible printed circuit board (PCB) 820, and a printed circuit board (PCB) 830. The conductive lines 211 are arranged in a predetermined manner without crossing, so as to form a plurality of touch sensing areas on the one-layer multi-touch sensor panel 810. The conductive lines 211 are divided into N driving conductive lines 211-1 and N×M sensing conductive lines 211-2. Each of the driving conductive lines 211-1 is operated with M sensing conductive lines 211-2 to form a sensing block, such that the one-layer multi-touch sensor panel 810 is divided into N sensing blocks. Each of the switch sets 85 has M input terminals and M output terminals. The M input terminals are connected to the M sensing conductive lines 211-2 corresponding to the sensing block, where N and M are each a positive integer. The M output terminals of each switch set 85 are respectively connected to a corresponding receiving terminal RX of the touch controller IC 830. More specifically, the panel 810 has N switch sets 85 connected to the N×M sensing conductive lines 211-2. The first output terminals of respective switch sets 85 are connected together for further connection to a corresponding receiving terminal RX1 of the touch controller IC 840, the second output terminals of respective switch sets 85 are connected together for further connection to a corresponding receiving terminal RX2 of the touch controller IC 840, and so on.

The embodiment of FIG. 8 is similar to that of FIG. 7 except that the touch controller IC 840 is implemented on the PCB 830. As shown in FIG. 8, since the N×M sensing conductive lines 211-2 can be reduced to N lines at an area denoted by the rectangle A, the size of the flexible PCB 620 becomes relatively small and, due to the switch sets 85, the touch detection is not affected by noises.

Figure 9:
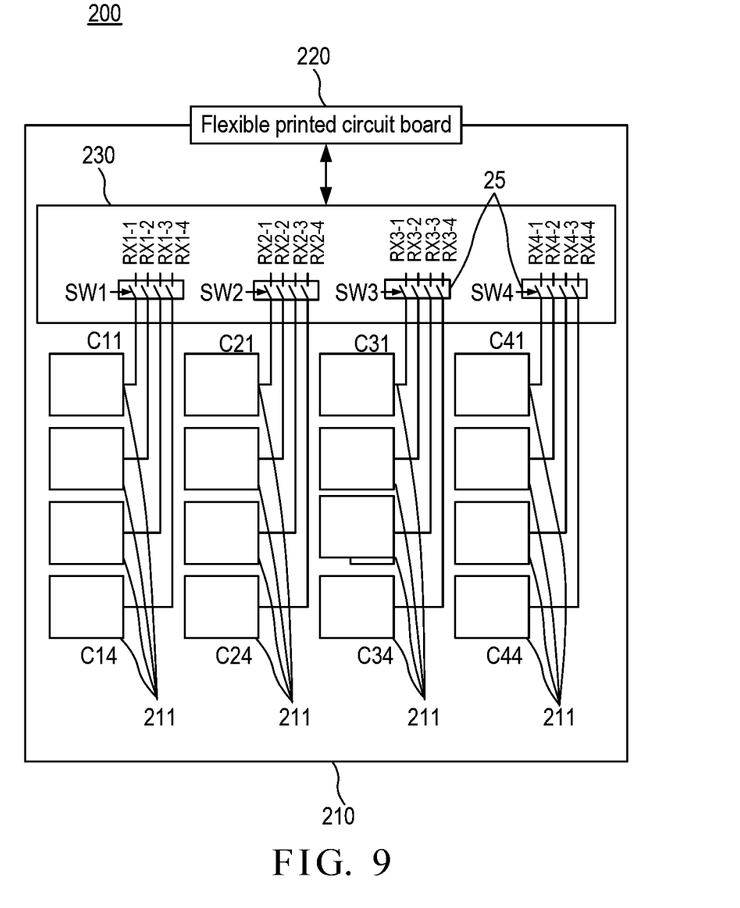
FIG. 9 is a schematic diagram of an active one-layer multi-touch sensor panel device according to still further another embodiment of the invention.

FIG. 9 is a schematic diagram of an active one-layer multi-touch sensor panel device 800 according to still further another embodiment of the invention, which is similar to the embodiment of FIG. 2, except that the conductive lines 211 are not divided into driving conductive lines 211-1 and sensing conductive lines 211-2. That is, the die 220 of touch controller IC performs point detection of self-capacitance touch, which is still suitable for the active one-layer multi-touch sensor panel device of the invention.

In view of the foregoing, it is known that, in the active one-layer multi-touch sensor panel device of the present invention, the switch sets are added in the die 220 of touch controller IC and/or the one-layer multi-touch sensor panels 210, 710, and only one switch set is activated in each specific time interval to prevent the operation from being affected by the noises occurred on the plurality of conductive lines connected to the remaining switch sets, such that the problem of low SNR caused by the mutual noise interface between the sensing blocks is overcome, and the accuracy of touch detection is increased. Further, the area required for the flexible PCB is effectively reduced to save the manufacturing cost.

Although the present invention has been explained in relation to its preferred embodiment, it is to be understood that many other possible modifications and variations can be made without departing from the spirit and scope of the invention as hereinafter claimed.

What is claimed is:

1. An active one-layer multi-touch sensor panel device, comprising:
    a one-layer multi-touch sensor panel, having a plurality of conductive lines arranged in a predetermined manner without crossing, so as to form a plurality of touch sensing areas thereon;
    a die of touch controller IC, bonded onto the one-layer multi-touch sensor panel and connected to the plurality of conductive lines, for driving the plurality of conductive lines and receiving sensing signals associated with the plurality of conductive lines so as to detect touch positions on the one-layer multi-touch sensor panel, wherein the conductive lines are divided into a plurality of driving conductive lines and a plurality of sensing conductive lines and the die of touch controller IC has a plurality of switch sets connected to the plurality of sensing conductive lines, each driving conductive line corresponding to a part of the sensing conductive lines connected to one of the switch sets, each of the switch sets having a plurality of input terminals connected to the sensing conductive lines corresponding to one driving conductive line, each of the switch sets having a plurality of output terminals, each of the output terminals having a dedicated transmission trace for transmitting the corresponding received sensing signal, such that only one of the switch sets is activated and the other switch sets are de-activated in a specific time interval to perform a touch sensing on a part of the sensing conductive lines connected to the switch set activated; and
    a flexible printed circuit board, electrically connected to the die by the one-layer multi-touch sensor panel, for transmitting the sensing signals received,
    wherein the die of touch controller IC is bonded onto the one-layer multi-touch sensor panel by a chip-on-glass (COG) method.

2. The device as claimed in claim 1, wherein the plurality of conductive lines are divided into N driving conductive lines and N×M sensing conductive lines, each of the N driving conductive lines corresponding to M sensing conductive lines to form a sensing block, such that the panel is divided into N sensing blocks, where N and M are each a positive integer.

3. The device as claimed in claim 2, wherein the die of touch controller IC includes N switch sets and N output terminals, the N output terminals being connected to the N driving conductive lines respectively, each of the N switch sets having M input terminals and connected to the M sensing conductive lines corresponding to one of the N sensing blocks.

4. The device as claimed in claim 3, wherein the die of touch controller IC drives an i-th driving conductive line in the specific time interval and activates an i-th switch set to receive the sensing signals from the M sensing conductive lines corresponding to an i-th sensing block, where i is an index.

5. The device as claimed in claim 3, wherein the die of touch controller IC drives an i-th driving conductive line and an (i+1)-th driving conductive line in the specific time interval and activates an i-th switch set and an (i+1)-th switch set to receive the sensing signals from the M sensing conductive lines respectively corresponding to an i-th sensing block and an (i+1)-th sensing block, where i is an index.

6. The device as claimed in claim 2, wherein the one-layer multi-touch sensor panel further includes N switch sets, each having M input terminals for connection to the M sensing conductive lines corresponding to one of the N sensing blocks.

7. The device as claimed in claim 2, wherein the die of touch controller IC is bonded onto the panel by an anisotropic conductive film (ACF), ultraviolet adhesive, or silver paste.

8. An active one-layer multi-touch sensor panel device, comprising:
    a one-layer multi-touch sensor panel, having a plurality of conductive lines arranged in a predetermined manner without crossing, so as to form a plurality of touch sensing areas thereon, wherein the plurality of conductive lines are divided into N driving conductive lines and N×M sensing conductive lines, each of the N driving conductive lines corresponding to M sensing conductive lines to form a sensing block, such that the panel is divided into N sensing blocks; and
    a flexible printed circuit board, having a die of touch controller IC with N switch sets and N output terminals, the N output terminals being connected to the N driving conductive lines respectively, each of the N switch sets having M input terminals respectively connected to the M sensing conductive lines corresponding to one of the N sensing blocks, each of the N switch sets having M output terminals, each of the output terminals having a dedicated transmission trace for transmitting corresponding sensing signal, such that only one of the switch sets is activated and the other switch sets are de-activated in a specific time interval to perform a touch sensing on a part of the conductive lines connected to the switch set activated, where N and M are each a positive integer.

9. An active one-layer multi-touch sensor device, comprising:
    a one-layer multi-touch sensor panel, having N switch sets and a plurality of conductive lines arranged in a predetermined manner without crossing, so as to form a plurality of touch sensing areas thereon, wherein the plurality of conductive lines are divided into N driving conductive lines and N×M sensing conductive lines, each of the N driving conductive lines corresponding to M sensing conductive lines to form a sensing block, such that the panel is divided into N sensing blocks, and each of the N switch sets has M input terminals respectively connected to the M sensing conductive lines corresponding to one of the N sensing blocks, each of the N switch sets having a plurality of output terminals, each of the output terminals having a dedicated transmission trace for transmitting corresponding signal, such that only one of the switch sets is activated and the other switch sets are de-activated in a specific time interval to perform a touch sensing on a part of the conductive lines connected to the switch set activated, where N and M are each a positive integer; and a flexible printed circuit board which has a touch controller IC, connected to the N driving conductive lines and the N switch sets to drive the N driving conductive lines and receive sensing signals associated with the plurality of conductive lines, wherein each of the N switch sets has M output terminals, and i-th output terminals of respective switch sets are connected together for further connection to a corresponding receiving terminal of the touch controller IC, where i is an index.

10. An active one-layer multi-touch sensor panel device, comprising:

a one-layer multi-touch sensor panel, having N switch sets and a plurality of conductive lines arranged in a predetermined manner without crossing, so as to form a plurality of touch sensing areas thereon, wherein the plurality of conductive lines are divided into N driving conductive lines and N×M sensing conductive lines, and each of the N driving conductive lines is operated with M sensing conductive lines to form a sensing block, such that the panel is divided into N sensing blocks, and each of the N switch sets has M input terminals and M output terminals and is respectively connected to the M sensing conductive lines corresponding to one of the N sensing blocks, each of the M output terminals having a dedicated transmission trace for transmitting corresponding sensing signal, such that only one of the switch sets is activated and the other switch sets are de-activated in a specific time interval to perform a touch sensing on a part of the conductive lines connected to the switch set activated, where N and M are each a positive integer;

a flexible printed circuit board having 2N traces, connected to the N driving conductive lines of the one-layer multi-touch sensor panel and the output terminals of the N switch sets respectively; and a printed circuit board having a touch controller IC, electrically connected to the N driving conductive lines and the output terminals of the N switch sets via the 2N traces of the flexible PCB, so as to drive the N driving conductive lines and receive sensing signals associated with the plurality of conductive lines, wherein i-th output terminals of respective switch sets are connected for further connection to a corresponding receiving terminal of the touch controller IC, where i is an index.

* * * * *